US006866765B2

(12) United States Patent
Ando et al.

(10) Patent No.: US 6,866,765 B2
(45) Date of Patent: Mar. 15, 2005

(54) ELECTROLYTIC COPPER-PLATED R-T-B MAGNET AND PLATING METHOD THEREOF

(75) Inventors: Setsuo Ando, Saitama-ken (JP); Minoru Endoh, Saitama-ken (JP); Tsutomu Nakamura, Saitama-ken (JP); Toru Fukushi, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 214 days.

(21) Appl. No.: 10/070,389

(22) PCT Filed: Jul. 4, 2001

(86) PCT No.: PCT/JP01/05798

§ 371 (c)(1), (2), (4) Date: Sep. 9, 2002

(87) PCT Pub. No.: WO02/04714

PCT Pub. Date: Jan. 17, 2002

(65) Prior Publication Data

US 2003/0052013 A1 Mar. 20, 2003

(30) Foreign Application Priority Data

Jul. 7, 2000 (JP) ....................................... 2000-206810
Mar. 9, 2001 (JP) ....................................... 2001-065821

(51) Int. Cl.[7] ............................ C25D 3/38; B32B 15/20

(52) U.S. Cl. ....................... 205/291; 205/170; 205/181; 205/182; 205/191; 205/271; 205/295; 205/296; 205/318; 205/319; 428/645; 428/646; 428/647; 428/657; 428/658; 428/670; 428/672; 428/673; 428/674; 428/675; 428/680; 428/472.1; 428/472.3; 428/935

(58) Field of Search ................................ 205/291, 170, 205/181, 182, 191, 271, 295, 296, 318, 319; 428/645, 646, 647, 657, 658, 670, 672, 673, 674, 675, 680, 935, 472.1, 472.3

(56) References Cited

U.S. PATENT DOCUMENTS 5,314,756 A 5/1994 Tagaya
5,348,639 A 9/1994 Mitsuji

FOREIGN PATENT DOCUMENTS

| | | |
|---|---|---|
| JP | 60-54406 | 3/1985 |
| JP | 5-9776 | 1/1993 |
| JP | 5-230687 | 9/1993 |
| JP | 7-176443 | 7/1995 |
| JP | 8-3763 | 1/1996 |
| JP | 2000-133541 | 5/2000 |
| WO | WO 99/23675 | 5/1999 |

*Primary Examiner*—Robert R. Koehler
(74) *Attorney, Agent, or Firm*—Sughrue Mion, PLLC

(57) ABSTRACT

An R-T-B magnet (R is at least one kind of rare-earth elements including Y, and T is Fe or Fe and Co) has an electrolytic copper-plating film where the ratio [I(200)/I(111)] of the X-ray diffraction peak intensity I(200) from the (200) plane to the X-ray diffraction peak intensity I(111) from the (111) plane is 0.1–0.45 in the X-ray diffraction by CuKal rays. This electrolytic copper-plating film is formed by an electrolytic copper-plating method using an electrolytic copper-plating solution which contains 20–150 g/L of copper sulphate and 30–250 g/L of chelating agent and contains no agent for reducing copper ions and has a pH adjusted to 10.5–13.5.

13 Claims, 6 Drawing Sheets

ELECTROLYTIC COPPER-PLATED R-T-B MAGNET AND PLATING METHOD THEREOF

FIELD OF THE INVENTION

The present invention relates to an R-T-B magnet provided with a electrolytic copper plating layer having a substantially uniform thickness and excellent scratch resistance free from pinholes, and a method for forming such an electrolytic copper plating layer on the R-T-B magnet using an electrolytic copper plating solution containing no cyanides.

BACKGROUND OF THE INVENTION

An R—Fe—B magnet containing an $R_2Fe_{14}B$ intermetallic compound as a main phase, wherein R is at least one of rare earth elements including Y, is usually plated because of poor oxidation resistance. Though plating metals are generally nickel, copper, etc., the R—Fe—B magnet is eroded by a nickel plating solution in direct contact, because the nickel plating solution is acidic. Accordingly, it is general to form a nickel plating layer on the surface of the R—Fe—B magnet after forming a copper plating layer thereon as a primer layer.

From the aspect of improving adhesion to a magnet substrate and preventing pinholes, a copper cyanide has conventionally been used for the copper plating (Japanese Patent Laid-Open No. 60-54406). However, because copper cyanide is extremely toxic, the highest attention should be paid to the safety of production, the control of plating solutions, and the treatment of waste water. In view of the recent trend of avoiding materials harmful to the environment, a copper plating method using no copper cyanide is desired.

Known as electrolytic copper plating solutions for R—Fe—B magnets are plating solutions of copper pyrophosphate, copper sulfate and copper borofluorate in addition to a plating solution of copper cyanide. It has been found, however, that when these electrolytic copper plating solutions are used for R—Fe—B magnets, metal elements in the R—Fe—B magnets are dissolved or subjected to a substitution reaction, resulting in electrolytic copper plating layers have poor adhesion to the R—Fe—B magnet and magnets without high thermal demagnetization resistance.

The electroless plating of R—Fe—B magnets is also carried out. Proposed as an electroless plating method in Japanese Patent Laid-Open No. 8-3763 is a method for forming an electroless copper plating layer as a first layer, an electrolytic copper plating layer as a second layer, and an electrolytic nickel-phosphorus plating layer as a third layer on an R—Fe—B magnet. However, because the first layer is an electroless copper plating layer in this method, it is not only poor in adhesion to the R—Fe—B magnet, but also it is easily self-decomposed because it is more unstable than the electrolytic plating solution.

Incidentally, as a method for forming an electrolytic copper plating not on an R—Fe—B magnet but in through-holes of a printed wiring board, Japanese Patent Laid-Open No. 5-9776 proposes a method for forming an electrolytic copper plating at a current density of 0.2–2.0 A/dm$^2$, using a plating solution at pH of 8–10, which contains 30–60 g/liter (hereinafter referred to as "g/L") of a chelating agent, 5–30 g/L of copper sulfate or a copper chelate compound, 50–500 ppm of a surfactant, and 0.5–5 cm$^3$/liter of a pH-buffering agent. However, in the electrolytic copper plating method using an electrolytic copper plating solution at pH of 8–10, it has been found that an electrolytic copper plating layer formed on the R—Fe—B magnet suffers from pinholes, and that the electrolytic copper plating layer has poor adhesion to the R—Fe—B magnet.

If there were slightest pinholes in the copper plating layer, the R—Fe—B magnet would gradually be oxidized, losing its desired magnetic properties. Also, poor adhesion to the R—Fe—B magnet causes the peeling of the copper plating layer from the R—Fe—B magnet, resulting in the oxidation of the R—Fe—B magnet.

Further, when the copper plating layer has a Vickers hardness lower than the predetermined level, small dents of about 50–500 μm are disadvantageously formed on the surface of the copper plating layer by the collision of the copper-plated R—Fe—B magnets with each other, etc., resulting in poor appearance and corrosion resistance.

OBJECT OF THE INVENTION

Accordingly, an object of the present invention is to provide a method for forming an electrolytic copper plating layer having a substantially uniform thickness and excellent scratch resistance free from pinholes on an R-T-B magnet, using an electrolytic copper plating solution containing no extremely toxic cyanide, and an R-T-B magnet having such an electrolytic copper plating layer.

DISCLOSURE OF THE INVENTION

The method of the present invention for forming an electrolytic copper plating on an R-T-B magnet, wherein R is at least one of rare earth elements including Y, and T is Fe or Fe and Co, comprising using an electrolytic copper plating solution containing 20–150 g/L of copper sulfate and 30–250 g/L of a chelating agent without containing an agent for reducing a copper ion, the pH of the electrolytic copper plating solution being controlled to 10.5–13.5.

Ethylenediaminetetraacetic acid (EDTA) is preferably used as the chelating agent. A typical example of the agent for reducing copper ions is formaldehyde.

The R-T-B magnet of the present invention has an electrolytic copper plating layer, in which a ratio of I(200)/I(111), wherein I(200) is an X-ray diffraction peak intensity of a (200) face, and I(111) is an X-ray diffraction peak intensity of a (111) face, is 0.1–0.45 in the X-ray diffraction of the electrolytic copper plating layer obtained with a CuKα1 line. This R-T-B magnet preferably contains as a main phase an $R_2T_{14}B$ intermetallic compound such that it has good corrosion resistance and high thermal demagnetization resistance. The electrolytic copper plating layer preferably has pinholes in the number of 0/cm$^2$ when measured by a ferroxyl test method (JIS H 8617). It further has an excellent scratch resistance with Vickers hardness of 260–350. The more preferred Vickers hardness is 275–350.

The R-T-B magnet preferably comprises a first layer of the electrolytic copper plating layer, and a second layer formed on the first layer, the second layer being a plating layer comprising at least one selected from the group consisting of Ni, Ni—Cu alloys, Ni—Sn alloys, Ni—Zn alloys, Sn—Pb alloys, Sn, Pb, Zn, Zn—Fe alloys, Zn—Sn alloys, Co, Cd, Au, Pd and Ag. The second layer is preferably constituted by an electrolytic or electroless nickel plating layer.

To have improved corrosion resistance, a chemical conversion coating layer such as chromate is preferably formed on a plating layer constituted by the second layer. When a surface of the chemical conversion coating layer is subjected to an alkali treatment with an aqueous solution of NaOH, etc., the surface of the chemical conversion coating layer is provided with improved adhesivity, whereby the R-T-B magnet is suitable for applications in which it is fixed to a surface of a ferromagnetic yoke, etc. with an adhesive.

The R-T-B magnet according to a preferred embodiment of the present invention has a plating layer, wherein the plating layer comprises an electrolytic copper plating layer and an electrolytic or electroless nickel plating layer in this order from the magnet side; wherein a ratio of I(200)/I(111), wherein I(200) is an X-ray diffraction peak intensity of a (200) face, and I(111) is an X-ray diffraction peak intensity of a (111) face, is 0.1–0.45 in the X-ray diffraction of the electrolytic copper plating layer obtained with a CuK$\alpha$1 line, and wherein the electrolytic copper plating layer is formed by an electrolytic copper plating method using an electrolytic copper plating solution containing 20–150 g/L of copper sulfate and 30–250 g/L of a chelating agent without containing an agent for reducing a copper ion, the pH of the electrolytic copper plating solution being controlled to 10.5–13.5.

The electrolytic copper plating method of the present invention is suitable for forming an electrolytic copper plating layer free from pinholes and having a substantially uniform thickness with excellent scratch resistance particularly on a surface of a thin or small R-T-B magnet, and the R-T-B magnet with such an electrolytic copper plating layer is suitable for rotors or actuators.

BRIEF DESCRIPTION OF THE DRAWINGS

FIG. 2(*b*) is a schematic view for describing the appearance of the Cu/Ni-plated R-T-B magnet with dents in COMPARATIVE EXAMPLE 9;

FIG. 7(*b*) is a scanning electron photomicrograph showing the cross section structure at a center on the inner diameter side of the Cu/Ni-plated R-T-B ring magnet in EXAMPLE 11.

THE BEST MODE FOR CARRYING OUT THE INVENTION

Figure 1:
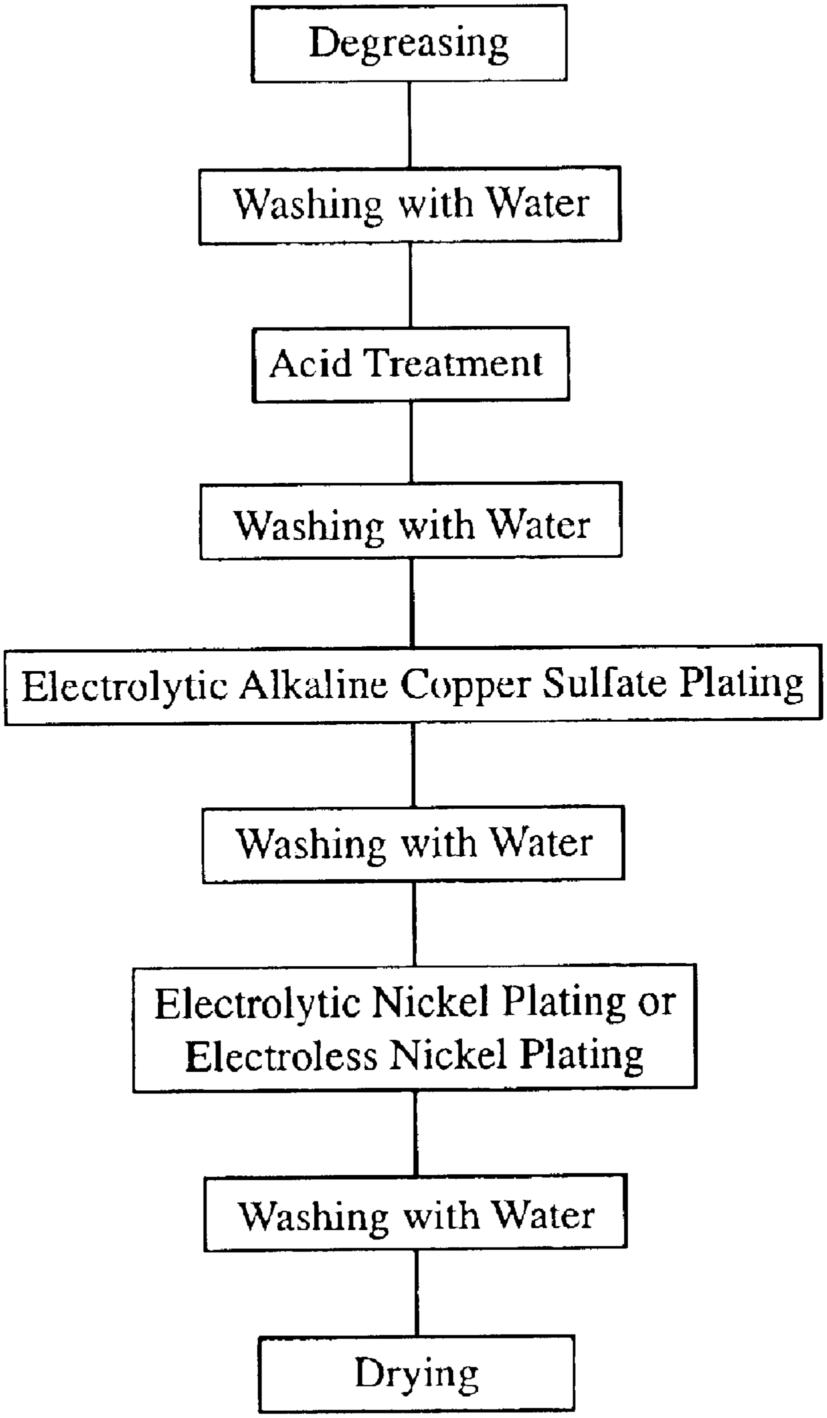
FIG. 1 is a flow chart showing the processes of the electrolytic copper plating method according to one embodiment of the present invention.

[1] Plating Method (A) Electrolytic Copper Plating Method

The Cu-plated R-T-B magnet of the present invention can be obtained, for instance, by an electrolytic copper plating method using barrel tanks or hanging jigs (racks), in which each R-T-B magnet is immersed in an alkaline electrolytic copper plating bath to form an electrolytic copper plating layer. Also, the Cu/Ni-plated R-T-B magnet according to a preferred embodiment of the present invention can be obtained, for instance, by immersing each R-T-B magnet in an alkaline electrolytic copper plating bath to form an electrolytic copper plating layer (first layer), and then forming an electrolytic or electroless nickel plating layer (surface layer: second layer). In any case, the function of the electrolytic copper plating layer is (1) to achieve good adhesion to the R-T-B magnet substrate, (2) to suppress the deterioration of magnetic properties, and (3) to provide good covering power necessary for the uniformity of a plating layer to the R-T-B magnet.

With respect to the function (1), the electrolytic copper plating method is generally superior to the electroless copper plating method. However, when an R-T-B magnet is immersed in a conventional acidic electrolytic copper plating solution, metal components in the R-T-B magnet may be dissolved away in a plating solution, causing a substitution reaction with metal ions in the plating solution and thus deteriorating the adhesion of the final plating layer to the R-T-B magnet. To prevent this, it is necessary to make the electrolytic copper plating solution alkaline in the predetermined range of pH. Also, the larger the difference in a thermal expansion coefficient between the R-T-B magnet substrate and the electrolytic copper plating layer, the lower adhesion the electrolytic copper plating layer has to the R-T-B magnet substrate. Accordingly, a softer electrolytic copper plating is more advantageous to increase the adhesion. However, the electrolytic copper plating is too soft, the collision of works with each other during electrolytic copper plating, etc. may produce dents on the surfaces of the electrolytic copper plating layers, resulting in poor appearance and starting points of pinholes. Thus, it is extremely important for practical purposes to impart the predetermined Vickers hardness to the electrolytic copper plating layer.

With respect to the function (2) of preventing the deterioration of magnetic properties, the deterioration of magnetic properties can be prevented unless metal components of the R-T-B magnet are dissolved away in an electrolytic copper plating solution. Accordingly, the electrolytic copper plating solution is preferably alkaline as in the case of (1).

With respect to the function (3) to provide the covering power, though it has generally been considered that the electroless copper plating method is more advantageous than the electrolytic copper plating method, it has been found as a result of intense research that the use of a complex-type, alkaline electrolytic copper plating solution makes it possible to obtain an electrolytic copper plating layer having a covering power equal to or more than that of the electroless copper plating layer.

Accordingly, the electrolytic copper plating solution used in the electrolytic copper plating method of the present invention for the R-T-B magnet contains copper sulfate and ethylenediaminetetraacetic acid (EDTA) in the predetermined amounts, so that it is alkaline at pH of 10.5–13.5. The concentration of copper sulfate in such electrolytic copper plating solution is 20–150 g/L, preferably 40–100 g/L.

When the concentration of copper sulfate is less than 20 g/L, the plating speed is extremely low, taking much time to obtain an electrolytic copper plating layer in the desired thickness. On the other hand, even when the concentration of copper sulfate is more than 150 g/L, there would be no corresponding advantages, resulting in only wasting excess copper sulfate.

The concentration of EDTA is 30–250 g/L, preferably 50–200 g/L. When the concentration of EDTA is less than 30 g/L, a copper slime gradually generates after forming the plating solution bath, resulting in poor stability in the electrolytic copper plating solution, and decrease in the adhesion of the resultant plating layer to the R-T-B magnet substrate because of the accumulation of a copper slime to the magnet, etc. On the other hand, even when the concentration of EDTA is more than 250 g/L, there would be no corresponding advantages, resulting in only wasting excess EDTA.

Usable as other chelating agents than EDTA may be diethylenetriaminepentaacetic acid (DTPA), N-hydroxyethylenediaminetriacetic acid (HEDTA), N,N,N,N-tetrakis(2-hydroxypropyl)-ethylenediamine (THPED), and amino carboxylic acid derivatives.

The electrolytic copper plating bath used for the electrolytic copper plating method of the present invention does not contain an agent for reducing copper ions such as formaldehyde. When the agent for reducing copper ions is contained, the resultant electrolytic copper plating layer is provided with a lot of pinholes.

The electrolytic copper plating solution has pH of 10.5–13.5, preferably 11.0–13.0, more preferably 11.0–12.5. When the pH is less than 10.5, a rough electrolytic copper plating layer is formed. On the other hand, when the pH is more than 13.5, there is a remarkable tendency that a hydroxide is formed on the surface of the electrolytic copper plating layer. In both cases, there is reduced adhesion between the substrate and the electrolytic copper plating layer.

The current density in the electrolytic copper plating is preferably 0.1–1.5 A/dm$^2$, more preferably 0.2–1.0 A/dm$^2$. When the current density is less than 0.1 A/dm$^2$, the copper plating speed is remarkably slow, needing much plating time to obtain an electrolytic copper plating layer with the predetermined thickness, and resulting in poor precipitation adhesion. On the other hand, when the current density is more than 1.5 A/dm$^2$, burnt plating occurs because of decrease in current efficiency, resulting in decrease in covering power.

The temperature of the electrolytic copper plating bath is preferably 10–70° C., more preferably 25–60° C. When the bath temperature is lower than 10° C., the resultant copper plating layer has poor adhesion to the R-T-B magnet substrate. Also, crystals are precipitated due to the decrease of the solubility of EDTA, causing the change of the composition of the electrolytic copper plating bath. On the other hand, when the bath temperature is higher than 70° C., the formation of carbonates is accelerated, resulting in remarkable decrease in pH and drastic evaporation of the electrolytic copper plating solution, so that the control of the plating solution is difficult.

When the pH control should be carried out frequently because a large number of R-T-B magnets are treated, a pH-buffering agent is added preferably in a proper amount. Though the electrolytic copper plating layer formed on the R-T-B magnet is usually glossy, a gloss agent is preferably added in the predetermined amount to further increase glossiness. Also, to increase flatness, a leveling agent is preferably added in the predetermined amount.

The electrolytic copper plating layer formed on the R-T-B magnet has an average thickness of preferably 0.5–20 μm, more preferably 2–10 μm. When the average thickness is less than 0.5 μm, a covering effect cannot practically be obtained. On the other hand, when it is more than 20 μm, the covering effect is not only saturated, but there is also too large a magnetic gap when assembled in a magnetic circuit, failing to achieve the desired magnetic properties.

As shown in FIG. 1, the R-T-B magnet is degreased with a proper degreasing agent and then washed with water before electrolytic copper plating. Thereafter, the R-T-B magnet is immersed in a diluted nitric acid bath, and then washed with water to clean the surface of the R-T-B magnet. Usable for acid treatment in place of a diluted nitric acid solution is at least one selected from the group consisting of diluted sulfuric acid or its salts, diluted hydrochloric acid or its salts and diluted nitric acid or its salts. The acid concentration is preferably 0.1–5% by weight, more preferably 0.5–3% by weight based on the acid treatment bath. When the acid concentration is less than 0.1% by weight, the cleaning of the R-T-B magnet surface is insufficient. On the other hand, when it is more than 5% by weight, too much etching occurs, resulting in remarkable deterioration of the magnetic properties of the R-T-B magnet.

(B) Nickel Plating Method

The surface of the R-T-B magnet is required to be hard. A soft electrolytic copper plating layer is usually not suitable for a surface layer, it is preferable to form a high-hardness nickel plating layer on the electrolytic copper plating layer. The formation of the high-hardness nickel plating layer may be carried out by a known electrolytic or electroless nickel plating method.

The electrolytic nickel plating solution suitable for the present invention preferably contains nickel sulfate, nickel chloride and boric acid in the predetermined amounts. The concentration of nickel sulfate is preferably 150–350 g/L, more preferably 200–300 g/L. When the concentration of nickel sulfate is less than 150 g/L, the electrolytic nickel plating speed is extremely low, needing a lot of steps to achieve the desired thickness. On the other hand, even when the concentration of nickel sulfate is more than 350 g/L, there would be no advantages, resulting in only wasting excess nickel sulfate.

The concentration of nickel chloride is preferably 20–150 g/L, more preferably 30–100 g/L. When the concentration of nickel chloride is less than 20 g/L, the dissolution of an anode is prevented, resulting in higher plating voltage and lower current efficiency. When the concentration of nickel chloride is more than 150 g/L, the electrolytic nickel plating layer has a large internal stress, resulting in decrease in the adhesion of the plating layer to the magnet.

The concentration of boric acid is preferably 10–70 g/L, more preferably 25–50 g/L. When the concentration of boric acid is less than 10 g/L, there is provided a weak pH-buffering action, resulting in large pH variation in the electrolytic nickel plating solution, thereby making it difficult to control the plating solution. Even if the concentration of boric acid is increased more than 70 g/L, there would be no advantages, only wasting excess boric acid.

The pH of the electrolytic nickel plating solution is preferably 2.5–5, more preferably 3.5–4.5. When the pH is less than 2.5, the resultant electrolytic Ni plating layer is brittle. On the other hand, when the pH is more than 5, nickel hydroxide is precipitated, resulting in losing the stability of the electrolytic nickel plating solution.

The temperature of the electrolytic nickel plating bath is preferably 35–60° C., more preferably 40–55° C. When the above bath temperature is lower than 35° C. or higher than 60° C., a coarse nickel-plating layer is formed.

The current density is preferably 0.1–1.5 A/dm$^2$, more preferably 0.2–1.0 A/dm$^2$. When the current density is less than 0.1 A/dm$^2$, the speed of electrolytic nickel plating is slow, taking a lot of plating time to obtain a plating layer of the predetermined thickness, and thus resulting in poor adhesion because of poor precipitation. On the other hand, when the current density is more than 1.5 A/dm$^2$, burnt plating occurs, resulting in decrease in the covering power.

A gloss agent, leveling agent, etc. are preferably added if necessary in the same manner as in the electrolytic copper plating.

To have good corrosion resistance and high magnetic properties, a nickel plating layer formed on the electrolytic copper plating layer of the R-T-B magnet has an average thickness of preferably 0.5–20 $\mu$m, more preferably 2–10 $\mu$m. When the average thickness is less than 0.5 $\mu$m, the nickel plating layer has substantially no covering effect. On the other hand, when it exceeds 20 $\mu$m, the covering effect is saturated.

[2] Electrolytic Copper Plating Layer

It has been found from the evaluations of X-ray diffraction (CuK$\alpha$1 line), pinholes, Vickers hardness and appearance that the electrolytic copper plating layer formed on the R-T-B magnet is free from pinholes and does not suffer from dents, when the ratio of I(200)/I(111), wherein I(200) is an X-ray diffraction peak intensity of a (200) face, and I(111) is an X-ray diffraction peak intensity of a (111) face, is in a range of 0.1–0.45. The ratio of I(200)/I(111) is preferably 0.20–0.35. An electrolytic copper plating layer with a ratio of I(200)/I(111) of less than 0.1 is difficult to be produced on an industrial scale. On the other hand, when the ratio of I(200)/I(111) is more than 0.45, pinholes are formed in the electrolytic copper plating layer. As a result, the electrolytic copper plating layer has poor corrosion resistance, or it has a remarkably decreased Vickers hardness, so that it is likely to suffer from dents, which make the appearance and corrosion resistance of the plating layer poor. This means that with an increased ratio of copper crystal grains oriented in a (200) face to those oriented in a (111) face among the copper crystal grains constituting the electrolytic copper plating layer, pinholes are likely to be formed, or the Vickers hardness of the plating layer remarkably decreases.

When the electrolytic copper plating method of the present invention is applied to a thin R-T-B magnet having a thickness of 3 mm or less in the thinnest portion, it is possible to provide the thin R-T-B magnet with good corrosion resistance and thermal demagnetization resistance. The "good thermal demagnetization resistance" means that an irreversible loss of flux is 3% or less in an R-T-B magnet formed to have a permeance coefficient (Pc) of 2, when it is returned to room temperature after heating at 85° C. for 2 hours in the atmosphere. The irreversible loss of flux is preferably 1% or less, particularly preferably 0%.

[3] R-T-B Magnet

The composition of the R-T-B magnet, to which the electrolytic copper plating method of the present invention is applicable, preferably has a structure comprising as a main phase an $R_2T_{14}B$ intermetallic compound comprising 27–34% by weight of R, and 0.5–2% by weight of B, the balance being T, based on the total amount (100% by weight) of main components (R, B and T).

Preferably used as R is Nd+Dy, Pr, Dy+Pr, or Nd+Dy+Pr. The amount of R is preferably 27–34% by weight. When R is less than 27% by weight, the intrinsic coercivity iHc of the magnet is extremely low. On the other hand, when it exceeds 34% by weight, the residual magnetic flux density Br of the magnet extremely decreases.

The amount of B is preferably 0.5–2% by weight. When B is less than 0.5% by weight, it is impossible to obtain as high iHc as suitable for practical use. On the other hand, when it is more than 2% by weight, the Br of the magnet is extremely low. The more preferred amount of B is 0.8–1.5% by weight.

To have good magnetic properties, the magnet preferably contains at least one element selected from the group consisting of Nb, Al, Co, Ga and Cu.

When 0.1–2% by weight of Nb is contained, a boride of Nb is formed in the sintering process, the abnormal growth of crystal grains as the main phase is suppressed, so that the R-T-B magnet has improved coercivity. When the amount of Nb is less than 0.1% by weight, there is only an insufficient effect of improving coercivity. On the other hand, when it is more than 2% by weight, too much Nb boride is formed, resulting in extremely low Br.

With 0.02–2% by weight of Al contained, the magnet has improved coercivity and oxidation resistance. When the amount of Al is less than 0.02% by weight, sufficient effect cannot be obtained. On the other hand, when it is more than 2% by weight, the Br of the R-T-B magnet is extremely low.

The amount of Co is preferably 0.3–5% by weight. When the amount of Co is less than 0.3% by weight, there is only an insufficient effect of improving the Curie temperature and corrosion resistance of the R-T-B magnet. On the other hand, when it is more than 5% by weight, the R-T-B magnet has extremely low Br and iHc.

The amount of Ga is preferably 0.01–0.5%. When the amount of Ga is less than 0.01% by weight, there is no effect of improving coercivity. On the other hand, when it is more than 0.5% by weight, decrease in Br is remarkable.

The amount of Cu is preferably 0.01–1% by weight. Though the addition of a trace amount of Cu improves iHc, the improvement of iHc is saturated when the amount of Cu exceeds 1% by weight. When the amount of Cu is less than 0.01% by weight, there is only an insufficient effect of improving iHc.

Based on the total amount (100% by weight) of the R-T-B sintered magnet, the permitted amounts of inevitable impurities are: (1) oxygen is 0.6% by weight or less, preferably 0.3% by weight or less, more preferably 0.2% by weight or less; (2) carbon is 0.2% by weight or less, preferably 0.1% by weight or less; (3) nitrogen is 0.08% by weight or less, preferably 0.03% by weight or less; (4) hydrogen is 0.02% by weight or less, preferably 0.01% by weight or less; and (5) Ca is 0.2% by weight or less, preferably 0.05% by weight or less, particularly preferably 0.02% by weight or less.

Thin R-T-B magnets, to which the electrolytic copper plating method of the present invention can be applied, are suitably thin ring R-T-B magnets of 2.3–4.0 mm in outer diameter, 1.0–2.0 mm in inner diameter and 2.0–6.0 mm in axial length with radial two-pole anisotropy suitable for vibrating motors of cell phones, etc., and rectangular (square) plate-shaped R-T-B magnets of 2.0–6.0 mm in length, 2.0–6.0 mm in width and 0.4–3 mm in thickness with anisotropy in their thickness directions suitable for actuators of pickup devices of CD or DVD, etc.

The present invention will be described in detail referring to Examples below without intention of limiting the present invention thereto.

EXAMPLE 1

Each of rectangular plate-shaped R-T-B sintered magnets of 10 mm in length, 70 mm in width and 6 mm in thickness with anisotropy in the thickness direction, which had a main component composition (weight %) comprising 25.0% of Nd, 5.0% of Pr, 1.5% of Dy, 1.0% of B, 0.5% of Co, 0.1% of Ga, 0.1% of Cu and 66.8% of Fe, was provided with an electrolytic copper plating layer and an electrolytic nickel layer by the plating method shown in FIG. 1. The plating processes were as follows.

First, each R-T-B magnet was degreased by a degreasing agent (trade name: Z-200, available from World Metal Co. Ltd.) at 30° C. for 1 minute, and then washed with water. Next, each R-T-B magnet was immersed in a diluted nitric acid bath at room temperature for 2 minutes to carry out an acid treatment, and then washed with water to clean the surface of each R-T-B magnet.

A barrel tank containing the cleaned R-T-B magnets was immersed in an alkaline copper sulfate plating bath (plating bath temperature: 70° C.) containing 20 g/L of copper sulfate and 30 g/L of EDTA-2Na, and subjected to electrolytic copper plating at pH of 10.6 and at a current density of 1.5 A/$dm^2$, to form an electrolytic copper plating layer having an average thickness of 10 $\mu$m, and then washed with water.

A barrel tank containing the electrolytic copper-plated R-T-B magnets was immersed in an electrolytic nickel plating bath at pH of 2.5 containing 350 g/L of nickel sulfate, 20 g/L of nickel chloride, 10 g/L of boric acid, and a gloss agent (containing 10 ml/L of Nick Liner-1 and 1 ml/L of Nick Liner-2, available from Okuno Chemical Industries Co. Ltd.), to form an electrolytic nickel plating layer having an average thickness of 8 $\mu$m under the conditions of a temperature of 35° C. and a current density of 0.1 A/$dm^2$. The resultant the Cu/Ni-plated R-T-B magnets were washed with water and dried.

The magnetic properties of the Cu/Ni-plated R-T-B magnet at room temperature were Br of 1.35T (13.5 kG), iHc of 1193.7 kA/m (15.0 kOe), and a maximum energy product $(BH)_{max}$ of 343.9 kJ/$m^3$ (43.2 MGOe).

Figure 3:
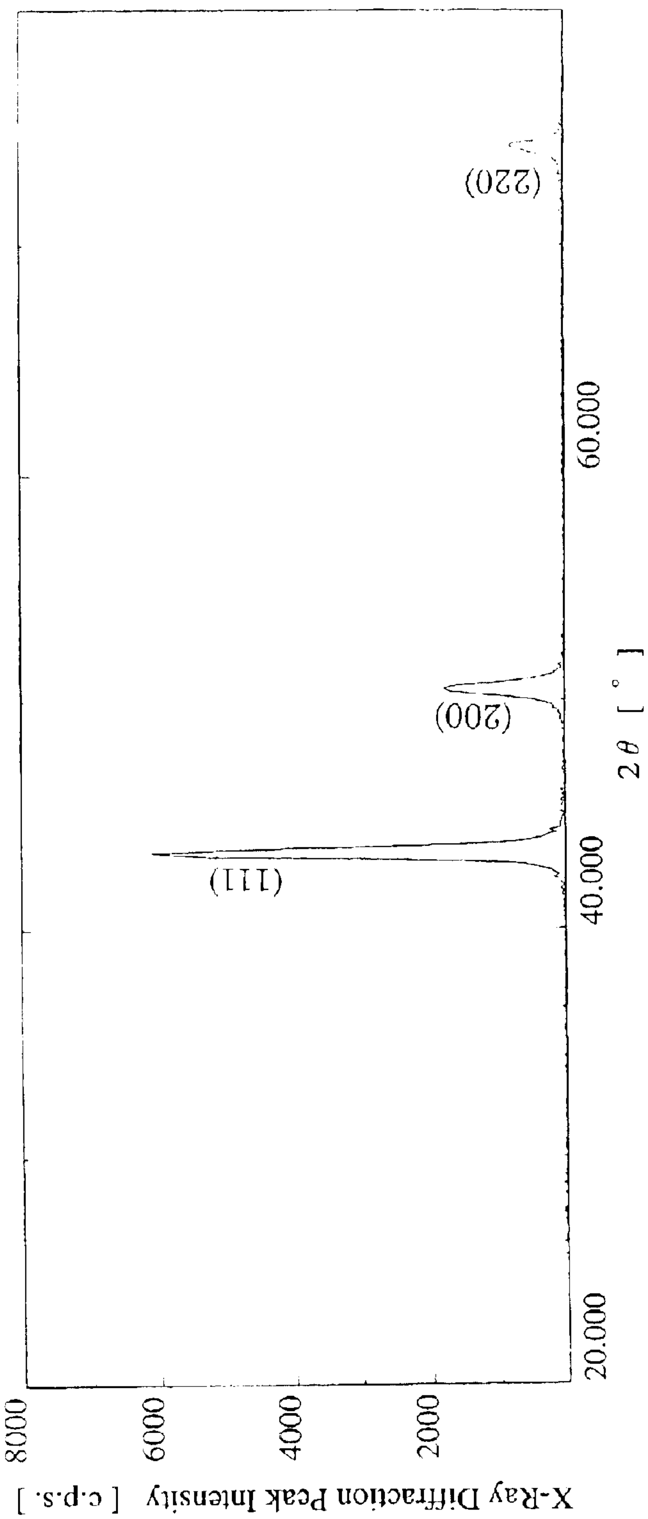
FIG. 3 is a graph showing an X-ray diffraction pattern of the R-T-B magnet in EXAMPLE 1.

The electrolytic nickel plating layer was removed from the surface of the Cu/Ni-plated R-T-B magnet by etching to prepare each sample with an exposed electrolytic copper plating layer. This sample was set in an X-ray diffraction apparatus (trade name: RINT-2500, available from RINT) to obtain an X-ray diffraction pattern by a 2θ-θ scanning method. The results are shown in FIG. 3. Used as an X-ray source was a CuKα1 line (λ=0.15405 nm), and noises (background) were removed by computer software stored in the apparatus. FIG. 3 has the axis of ordinates showing the number of counting (c.p.s.: counts per second), and the axis of abscissas showing 2θ (°). As is clear from the X-ray diffraction pattern shown in FIG. 3, a ratio of I(200)/I(111) in the electrolytic copper plating layer was 0.29, wherein I(200) was an X-ray diffraction peak intensity of a (200) face, and I(111) was an X-ray diffraction peak intensity of a (111) face.

A Vickers hardness was determined by measuring five samples each having an exposed electrolytic copper plating layer on flat surfaces, and averaging the measured values of the five samples. As a result, the Vickers hardness was 310.

With respect to a sample with an exposed electrolytic copper plating layer, the number of pinholes penetrating from the surface of the copper plating layer to the surface of the R-T-B magnet substrate was measured by a ferroxyl test method (JIS H 8617). As a result, it was found that the number of pinholes in the electrolytic copper plating layer was 0/$cm^2$.

Next, the adhesion of the plating layer to the R-T-B magnet substrate was evaluated by a peel test. First, the magnet surface was cut by a cutting knife to have grooves with a depth reaching the magnet substrate in a rectangular pattern of 4 mm in length and 50 mm in width. A force per a unit length (adhesion) necessary for peeling the plating layer along the longer side of a rectangular portion surrounded by the grooves was measured by a force gauge. The adhesion of 20 Cu/Ni-plated R-T-B magnets in total was measured by this procedure, and their average value was determined as adhesion. The peeling took place in an interface between the magnet substrate and the electrolytic copper plating layer in any samples after the peel test.

Next, magnet pieces having a permeance coefficient of 2 were cut out from the above sintered magnet of 10 mm in length, 70 mm in width and 6 mm in thickness, and an electrolytic copper plating layer having an average thickness of 10 $\mu$m and an electrolytic nickel plating layer having an average thickness of 8 $\mu$m were formed in the same manner as above to prepare samples for the measurement of a thermal demagnetization ratio. After the samples were magnetized at room temperature under the conditions that the total magnetic flux was saturated, the total magnetic flux $\Phi_1$ of each sample was measured. Each sample after the measurement of $\Phi_1$ was heated at 85° C. for 2 hours in the atmosphere, and then cooled to room temperature. Thereafter, the total magnetic flux $\Phi_2$ of each sample was measured. A thermal demagnetization ratio (thermal demagnetization resistance) was determined from $\Phi_1$ and $\Phi_2$ according to the following formula:

$$\text{Thermal demagnetization ratio}=[(\Phi_1-\Phi_2)/\Phi_1]\times 100(\%).$$

Incidentally, the samples cooled to room temperature had good appearance.

It was found from the cross section photograph of the Cu/Ni-plated R-T-B magnet sample that the electrolytic copper plating layer had excellent adhesion to the R-T-B magnet, and that the electrolytic copper plating layer had a good covering power. These results are shown in Table 1.

EXAMPLE 2

An R-T-B magnet was provided with an electrolytic copper plating layer and then washed with water in the same manner as in EXAMPLE 1. The copper-plated R-T-B magnet was immersed in an electroless nickel plating solution (trade name: NIBODULE, available from Okuno Chemical Industries Co. Ltd.) at 80° C. for 60 minutes, and then washed with water and dried to form an electroless nickel plating layer having an average thickness of 8 $\mu$m. The resultant Cu/Ni-plated R-T-B magnet was evaluated in the same manner as in EXAMPLE 1. The results are shown in Table 1. The results of the peel test revealed that peeling took place in an interface between the magnet substrate and the electrolytic copper plating layer in any samples. Also, the samples cooled to room temperature for the measurement of a thermal demagnetization ratio had good appearance.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.28. Further, the same measurement of the sample with an exposed electrolytic copper plating layer as in EXAMPLE 1 revealed that the electrolytic copper plating layer had a Vickers hardness of 309, and that the number of pinholes in the electrolytic copper plating layer was 0/cm$^2$.

EXAMPLE 3

An R-T-B magnet was provided with an electrolytic copper plating layer and then washed with water in the same manner as in EXAMPLE 1. The copper-plated R-T-B magnet was immersed in an electroless nickel plating solution (trade name: Top Nicoron F153, available from Okuno Chemical Industries Co. Ltd.) at 90° C. for 60 minutes, and then washed with water and dried, to form an electroless nickel plating layer having an average thickness of 8 $\mu$m. The resultant Cu/Ni-plated R-T-B magnet was evaluated in the same manner as in EXAMPLE 1. The results are shown in Table 1. The results of the peel test revealed that peeling took place in an interface between the magnet substrate and the electrolytic copper plating layer in any samples. Also, the samples cooled to room temperature for the measurement of a thermal demagnetization ratio had good appearance.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.21. Further, the same measurement of the sample with an exposed electrolytic copper plating layer as in EXAMPLE 1 revealed that the electrolytic copper plating layer had a Vickers hardness of 316, and that the number of pinholes in the electrolytic copper plating layer was 0/cm$^2$.

EXAMPLE 4

In the same manner as in EXAMPLE 1 except for using the conditions of electrolytic copper plating and electrolytic nickel plating shown in Table 1, an electrolytic copper plating layer having an average thickness of 10 $\mu$m and an electrolytic nickel plating layer having an average thickness of 8 $\mu$m were successively formed on the surface of the R-T-B sintered magnet of EXAMPLE 1. Each of the resultant Cu/Ni-plated R-T-B magnet was evaluated in the same manner as in EXAMPLE 1. The results are shown in Table 1. The results of the peel test revealed that peeling took place in an interface between the magnet substrate and the electrolytic copper plating layer in any sample. Also, the samples cooled to room temperature for the measurement of a thermal demagnetization ratio had good appearance.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.33. Further, the same measurement of the sample with an exposed electrolytic copper plating layer as in EXAMPLE 1 revealed that the electrolytic copper plating layer had a Vickers hardness of 296, and that the number of pinholes in the electrolytic copper plating layer was 0/cm$^2$.

EXAMPLE 5

An R-T-B magnet was provided with an electrolytic copper plating layer and then washed with water in the same manner as in EXAMPLE 4. The copper-plated R-T-B magnet was immersed in an electroless nickel plating solution (trade name: NIBODULE, available from Okuno Chemical Industries Co. Ltd.) at 80° C. for 60 minutes, and then washed with water and dried to form an electroless nickel plating layer having an average thickness of 8 $\mu$m. Each of the resultant Cu/Ni-plated R-T-B magnets was evaluated in the same manner as in EXAMPLE 4. The results are shown in Table 1. The results of the peel test revealed that peeling took place in an interface between the magnet substrate and the electrolytic copper plating layer in any samples. Also, the samples cooled to room temperature for the measurement of a thermal demagnetization ratio had good appearance.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.36. Further, the same measurement of the sample with an exposed electrolytic copper plating layer as in EXAMPLE 1 revealed that the electrolytic copper plating layer had a Vickers hardness of 290, and that the number of pinholes in the electrolytic copper plating layer was 0/cm$^2$.

EXAMPLE 6

An R-T-B magnet was provided with an electrolytic copper plating layer and then washed with water in the same manner as in EXAMPLE 4. The copper-plated R-T-B magnet was immersed in an electroless nickel plating solution (trade name: Top Nicoron F153, available from Okuno Chemical Industries Co. Ltd.) at 90° C. for 60 minutes, and then washed with water and dried to form an electroless nickel plating layer having an average thickness of 8 $\mu$m. Each of the resultant Cu/Ni-plated R-T-B magnets was evaluated in the same manner as in EXAMPLE 4. The results are shown in Table 1. The results of the peel test revealed that peeling took place in an interface between the magnet substrate and the electrolytic copper plating layer in any samples. Also, the samples cooled to room temperature for the measurement of a thermal demagnetization ratio had good appearance.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.34. Further, the same measurement of the sample with an exposed electrolytic copper plating layer as in EXAMPLE 1 revealed that the electrolytic copper plating layer had a Vickers hardness of 296, and that the number of pinholes in the electrolytic copper plating layer was 0/cm$^2$.

EXAMPLE 7

In the same manner as in EXAMPLE 1 except for using the conditions of electrolytic copper plating and electrolytic nickel plating shown in Table 1, an electrolytic copper plating layer having an average thickness of 10 $\mu$m and an electrolytic nickel plating layer having an average thickness of 8 $\mu$m were successively formed on the surface of the R-T-B sintered magnet. The resultant Cu/Ni-plated R-T-B magnets were evaluated in the same manner as in EXAMPLE 1. The results are shown in Table 1. The results of the peel test revealed that peeling took place in an interface between the magnet substrate and the electrolytic copper plating layer in any samples. Also, the samples cooled to room temperature for the measurement of a thermal demagnetization ratio had good appearance.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.39. Further, the same measurement of the sample with an exposed electrolytic copper plating layer as in EXAMPLE 1 revealed that the electrolytic copper plating layer had a Vickers hardness of 274, and that the number of pinholes in the electrolytic copper plating layer was 0/cm$^2$.

EXAMPLE 8

An R-T-B magnet was provided with an electrolytic copper plating layer and then washed with water in the same manner as in EXAMPLE 7. The copper-plated R-T-B magnet was immersed in an electroless nickel plating solution (trade name: NIBODULE, available from Okuno Chemical Industries Co. Ltd.) at 80° C. for 60 minutes, and then washed with water and dried to form an electroless nickel plating layer having an average thickness of 8 $\mu$m. Each of the resultant Cu/Ni-plated R-T-B magnets was evaluated in the same manner as in EXAMPLE 7. The results are shown in Table 1. The results of the peel test revealed that peeling took place in an interface between the magnet substrate and the electrolytic copper plating layer in any samples. Also, the samples cooled to room temperature for the measurement of a thermal demagnetization ratio had good appearance.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.38. Further, the same measurement of the sample with an exposed electrolytic copper plating layer as in EXAMPLE 1 revealed that the electrolytic copper plating layer had a Vickers hardness of 282, and that the number of pinholes in the electrolytic copper plating layer was 0/cm$^2$.

EXAMPLE 9

An R-T-B magnet was provided with an electrolytic copper plating layer and then washed with water in the same manner as in EXAMPLE 7. The copper-plated R-T-B magnet was immersed in an electroless nickel plating solution (trade name: Top Nicoron F153, available from Okuno Chemical Industries Co. Ltd.) at 90° C. for 60 minutes, and then washed with water and dried, to form an electroless nickel plating layer having an average thickness of 8 $\mu$m. Each of the resultant Cu/Ni-plated R-T-B magnets was evaluated in the same manner as in EXAMPLE 7. The results are shown in Table 1. The results of the peel test revealed that peeling took place in an interface between the magnet substrate and the electrolytic copper plating layer in any samples. Also, the samples cooled to room temperature for the measurement of a thermal demagnetization ratio had good appearance.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.38. Further, the same measurement of the sample with an exposed electrolytic copper plating layer as in EXAMPLE 1 revealed that the electrolytic copper plating layer had a Vickers hardness of 280, and that the number of pinholes in the electrolytic copper plating layer was 0/cm$^2$.

TABLE 1

| No. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| First Plating Layer (Electrolytic Copper Plating) | | | | | | | | | |
| Copper Sulfate (g/L) | 20 | 20 | 20 | 60 | 60 | 60 | 150 | 150 | 150 |
| EDTA-2Na (g/L) | 30 | 30 | 30 | 150 | 150 | 150 | 250 | 250 | 250 |
| pH | 10.6 | 10.6 | 10.6 | 12.5 | 12.5 | 12.5 | 13.5 | 13.5 | 13.5 |
| Bath Temperature (° C.) | 70 | 70 | 70 | 50 | 50 | 50 | 10 | 10 | 10 |
| Current Density (A/dm$^2$) | 1.5 | 1.5 | 1.5 | 0.3 | 0.3 | 0.3 | 0.1 | 0.1 | 0.1 |
| Second Plating Layer (Electrolytic Nickel Plating) | | | | | | | | | |
| Nickel Sulfate (g/L) | 350 | — | — | 290 | — | — | 150 | — | — |
| Nickel Chloride (g/L) | 20 | — | — | 45 | — | — | 150 | — | — |
| Boric Acid (g/L) | 10 | — | — | 40 | — | — | 70 | — | — |
| pH | 2.5 | — | — | 4.0 | — | — | 5.0 | — | — |
| Bath Temperature (° C.) | 35 | — | — | 50 | — | — | 60 | — | — |
| Current Density (A/dm$^2$) | 0.1 | — | — | 0.5 | — | — | 1.5 | — | — |
| Electroless Nickel (Nibodule) | — | 8 $\mu$m | — | — | 8 $\mu$m | — | — | 8 $\mu$m | — |
| Electroless Nickel (Top Nicoron F153) | — | — | 8 $\mu$m | — | — | 8 $\mu$m | — | — | 8 $\mu$m |
| I(200)/I(111) | 0.29 | 0.28 | 0.21 | 0.33 | 0.36 | 0.34 | 0.39 | 0.38 | 0.38 |
| Vickers Hardness | 310 | 309 | 316 | 296 | 290 | 296 | 274 | 282 | 280 |
| Number of Pinholes (/cm$^2$) | 0 | 0 | 0 | 0 | 0 | 0 | 0 | 0 | 0 |
| Adhesion to R-T-B Magnet Substrate (N/cm) | 1.96 | 1.90 | 1.88 | 2.16 | 1.98 | 2.10 | 1.76 | 1.80 | 1.82 |
| Covering Power | Good | Good | Good | Good | Good | Good | Good | Good | Good |
| Thermal Demagnetization Ratio (%) | 0 | 0 | 0 | 0 | 0 | 0 | 0 | 0 | 0 |
| Designated Toxic Components | None | None | None | None | None | None | None | None | None |

Note:
A 10-volume % diluted aqueous sulfuric acid solution was added to the electrolytic copper plating bath of EXAMPLE 1 for pH control.
A 10-volume % aqueous NaOH solution was added to the electrolytic copper plating baths of EXAMPLES 4 and 7 for pH control.

COMPARATIVE EXAMPLE 1

An R-T-B magnet acid-treated and then washed with water in the same manner as in EXAMPLE 1 was immersed in an acidic copper sulfate plating bath at a temperature 25° C. and pH of 0.5, which contained 220 g/L of copper sulfate, 50 g/L of sulfuric acid, 70 mg/L of chlorine ion and a proper amount of a gloss agent (trade name: Cu-board HA, available from Ebara Udylite Co., Ltd.) to form a copper plating layer having an average thickness of 10 μm at a current density of 0.4 A/dm$^2$, and then washed with water.

The copper-plated R-T-B magnet was immersed in a Watts bath at a temperature of 47° C. and pH of 4.0, which contained 250 g/L of nickel sulfate, 40 g/L of nickel chloride, 30 g/L of boric acid, and 1.5 g/L of saccharin (primary gloss agent), to form an electrolytic nickel layer having an average thickness of 8 μm at a current density of 0.4 A/dm$^2$, and then washed with water and dried. The resultant Cu/Ni-plated R-T-B magnets were subjected to the same evaluation as in EXAMPLE 1. The results are shown in Table 2.

A sample with an exposed electrolytic copper plating layer was formed by removing the nickel plating layer from the surface of the Cu/Ni-plated R-T-B magnet by etching in the same manner as in EXAMPLE 1, to measure its X-ray diffraction. As a result, the I(200)/I(111) of the sample was 0.66. Further, the same measurement of the electrolytic copper plating layer as in EXAMPLE 1 revealed that the number of pinholes was 39/cm$^2$. Because of such many pinholes, the Cu/Ni-plated R-T-B magnet was poor in corrosion resistance and thermal demagnetization ratio.

COMPARATIVE EXAMPLE 2

An R-T-B magnet acid-treated and then washed with water in the same manner as in EXAMPLE 1 was immersed in a copper pyrophosphate bath at a temperature of 55° C. and pH of 9.0, which contained 380 g/L of copper pyrophosphate, 100 g/L of pyrophosphoric acid, 3 ml/L of ammonia water and 1 ml/L of a gloss agent (trade name: Pyrotop PC, available from Okuno Chemical Industries Co. Ltd.), to form an electrolytic copper plating layer having an average thickness of 10 μm at a current density of 0.4 A/dm$^2$, and then washed with water. An electrolytic nickel layer having an average thickness of 8 μm was formed by a Watts bath in the same manner as in COMPARATIVE EXAMPLE 1. The resultant Cu/Ni-plated R-T-B magnets were subjected to the same evaluation as in EXAMPLE 1. The results are shown in Table 2.

A sample with an exposed electrolytic copper plating layer was formed by removing the nickel plating layer from the surface of the Cu/Ni-plated R-T-B magnet by etching in the same manner as in EXAMPLE 1, to measure its X-ray diffraction. As a result, the I(200)/I(111) of the sample was 0.63. Further, the same measurement of the electrolytic copper plating layer as in EXAMPLE 1 revealed that the number of pinholes was 19/cm$^2$. Because of such many pinholes, the Cu/Ni-plated R-T-B magnet was poor in corrosion resistance and thermal demagnetization ratio.

COMPARATIVE EXAMPLE 3

An R-T-B magnet acid-treated and then washed with water in the same manner as in EXAMPLE 1 was immersed in a copper borofluorate bath at a temperature of 35° C. and pH of 0.5, which contained 350 g/L of copper borofluorate and 20 g/L of borofluoric acid, to form an electrolytic copper plating layer having an average thickness of 10 μm at a current density of 0.4 A/dm$^2$, and then washed with water. An electrolytic nickel layer having an average thickness of 8 μm was formed by a Watts bath in the same manner as in COMPARATIVE EXAMPLE 1. The resultant Cu/Ni-plated R-T-B magnets were subjected to the same evaluation as in EXAMPLE 1. The results are shown in Table 2.

A sample with an exposed electrolytic copper plating layer was formed from the Cu/Ni-plated R-T-B magnet in the same manner as in EXAMPLE 1, to measure the number of pinholes in the electrolytic copper plating layer. As a result, the number of pinholes was 40/cm$^2$. Thus, the Cu/Ni-plated R-T-B magnet was poor in corrosion resistance and thermal demagnetization ratio.

COMPARATIVE EXAMPLE 4

An R-T-B magnet acid-treated and then washed with water in the same manner as in EXAMPLE 1 was immersed in a copper cyanide bath at a temperature of 60° C. and pH of 12.5, which contained 55 g/L of cuprous cyanide, 80 g/L of sodium cyanide, 19 g/L of free sodium cyanide, 55 g/L of a Rochelle salt, and 11 g/L of potassium hydroxide, to form an electrolytic copper plating layer having an average thickness of 10 μm at a current density of 0.4 A/dm$^2$, and then washed with water. An electrolytic nickel layer having an average thickness of 8 μm was formed by a Watts bath in the same manner as in COMPARATIVE EXAMPLE 1. The resultant Cu/Ni-plated R-T-B magnets were subjected to the same evaluation as in EXAMPLE 1. The results are shown in Table 2.

Figure 4:
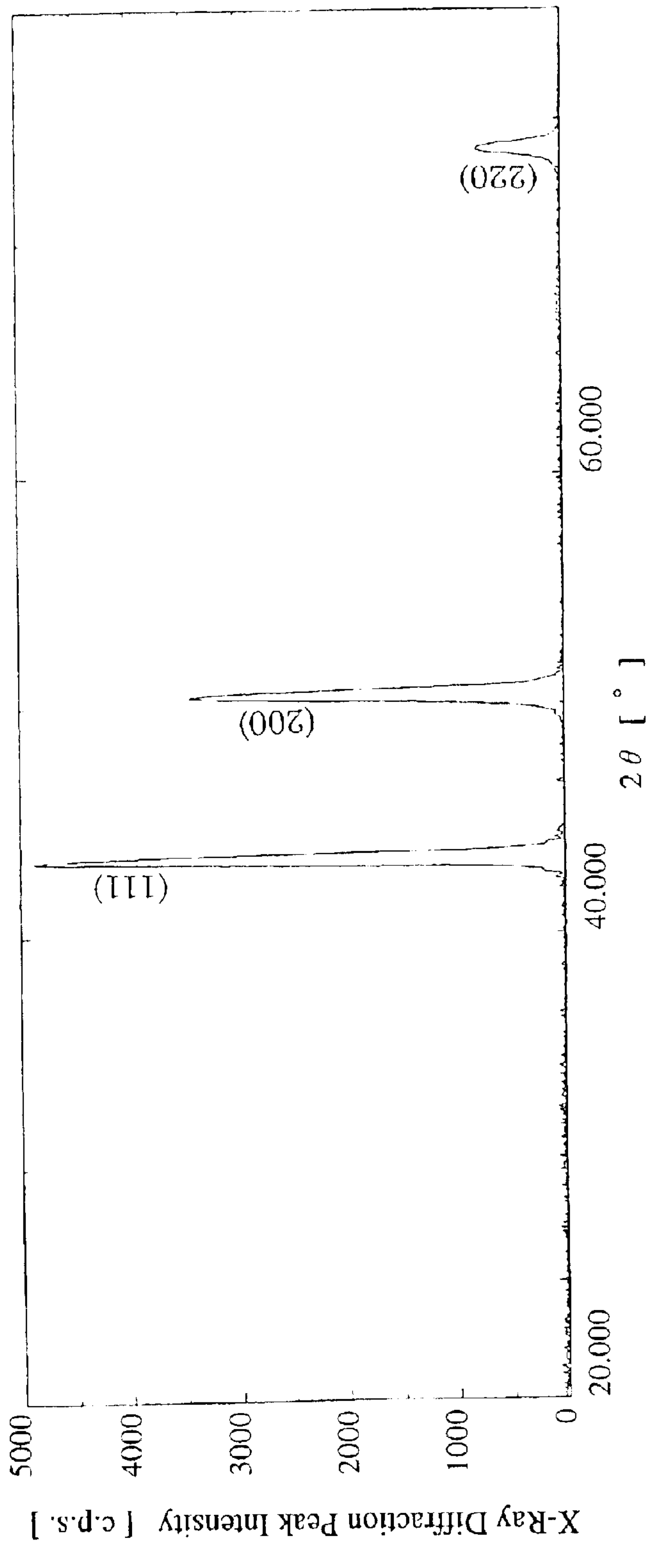
FIG. 4 is a graph showing the X-ray diffraction pattern of the R-T-B magnet in COMPARATIVE EXAMPLE 4.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.71. The X-ray diffraction pattern is shown in FIG. 4. Further, the same measurement of the electrolytic copper plating layer as in EXAMPLE 1 revealed that the electrolytic copper plating layer had a Vickers hardness of 251, and that the number of pinholes in the electrolytic copper plating layer was 0/cm$^2$.

COMPARATIVE EXAMPLE 5

An R-T-B magnet acid-treated and then washed with water in the same manner as in EXAMPLE 1 was immersed in an electroless copper plating bath at pH of 12.2 and at a temperature of 70° C., which contained 10 g/L of copper sulfate, 30 g/L of EDTA, and 3 ml/L of formaldehyde (HCHO), to form an electroless copper plating layer having an average thickness of 10 μm, and then washed with water. Next, an electrolytic nickel plating layer having an average thickness of 8 μm was formed by a Watts bath in the same manner as in COMPARATIVE EXAMPLE 1. Formaldehyde functions as a reducing agent for supplying electrons to copper ions in the above electroless copper plating bath to precipitate copper on the surface of the R-T-B magnet substrate. Accordingly, formaldehyde per se was oxidized during electroless copper plating to form sodium formate (HCOONa) as an impurity, which was accumulated in the electroless copper plating bath. The resultant Cu/Ni-plated R-T-B magnets were evaluated in the same manner as in EXAMPLE 1. The results are shown in Table 2.

A sample with an exposed electrolytic copper plating layer was formed from the Cu/Ni-plated R-T-B magnet in the same manner as in EXAMPLE 1, to measure its X-ray diffraction. As a result, the I(200)/I(111) of the sample was 0.65. Further, the same measurement of the electrolytic copper plating layer as in EXAMPLE 1 revealed that the electrolytic copper plating layer had a Vickers hardness of 242, and that the number of pinholes in the electrolytic copper plating layer was 0/cm$^2$.

COMPARATIVE EXAMPLE 6

An R-T-B magnet was subjected to electrolytic copper plating in the same manner as in EXAMPLE 4 except for using an electroless copper plating solution of COMPARATIVE EXAMPLE 5 at pH of 12.2, which contained 10 g/L of copper sulfate, 30 g/L of EDTA, and 3 ml/L of formaldehyde in place of the electrolytic copper plating solution of EXAMPLE 4. As a result, an electrolytic copper plating layer having as many pinholes as about 50/cm$^2$ was obtained. This is because the supply of electrons from formaldehyde to copper ions in the copper plating solution (reduction) and the supply of electrons from an external electrode for electroplating (reduction) take place simultaneously.

COMPARATIVE EXAMPLE 7

Electrolytic copper plating was carried out in the same manner as in EXAMPLE 1 except for using an electrolytic copper plating bath having a composition of 20 g/L of copper sulfate and 30 g/L of EDTA-2Na, with an increased amount of a 10-volume % diluted aqueous sulfuric acid solution than in EXAMPLE 1, under the conditions of pH of 9.0, a plating bath temperature of 70° C. and a current density of 1.5 A/dm$^2$. The precipitation of EDTA-2Na occurred remarkably, resulting in the decomposition of the electrolytic copper plating solution. Thus, satisfactory electrolytic copper plating could not be conducted.

provided with an electrolytic copper plating layer having an average thickness of about 8 μm in the same manner as in EXAMPLE 4 except for using a current density of 0.2–0.7 A/dm$^2$ and a plating time of 80 minutes. Next, an electrolytic nickel layer having an average thickness of 5 μm was formed in the same manner as in EXAMPLE 4 except for changing the plating time. The electrolytic copper plating layer of the resultant Cu/Ni-plated R-T-B magnet had good covering power.

Figure 5:
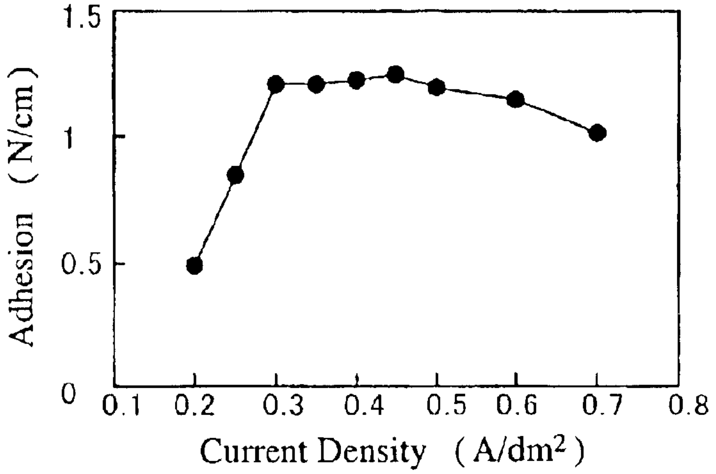
FIG. 5 is a graph showing the relation between current density in the electrolytic copper plating process in EXAMPLE 10 and the adhesion of a plating layer to the R-T-B magnet.

One example of the relations between the adhesion of the plating layer and the current density at the time of electrolytic copper plating is shown in FIG. 5. It is clear from FIG. 5 that the adhesion of the plating layer was 0.5 N/cm or more when the current density at the time of electrolytic copper plating was 0.2–0.7 A/dm$^2$, and that the adhesion of the plating layer was more than 1.0 N/cm when the current density was 0.3–0.7 A/dm$^2$. In each R-T-B magnet provided with electrolytic copper plating at a current density of 0.2–0.7 A/dm$^2$, peeling was appreciated in the peel test in an interface between the substrate and the electrolytic copper plating layer.

An electrolytic nickel plating layer was removed by etching from the surface of a Cu/Ni-plated R-T-B magnet

TABLE 2

| No. | Com Ex. 1 | Com. Ex. 2 | Com. Ex. 3 | Com. Ex. 4 | Com. Ex. 5 |
|---|---|---|---|---|---|
| First Plating Layer | Acidic Copper Sulfate | Copper Pyrophosphate | Copper Borofluorate | Copper Cyanide | Electroless Copper |
| Second Plating Layer | Electrolytic Nickel (Watts Bath) | Electrolytic Nickel (Watts Bath) | Electrolytic Nickel (Watts Bath) | Electrolytic Nickel (Watts Bath) | Electrolytic Nickel (Watts Bath) |
| I(200)/I(111) | 0.66 | 0.63 | — | 0.71 | 0.65 |
| Vickers Hardness | — | — | — | 251 | 242 |
| Number of Pinholes (/cm$^2$) | 39 | 19 | 40 | 0 | 0 |
| Adhesion to Magnet Substrate (N/cm) | 0.20 | 0.39 | 0.34 | 1.47 | 0.49 |
| Covering Power | Poor | Poor | Poor | Good | Good |
| Thermal Demagnetization Ratio (%) | 13.5 | 8.0 | 7.5 | 0 | 0 |
| Designated Toxic Components | None | None | None | Yes (Cyanide) | None |

It was found from Tables 1 and 2 that any of EXAMPLES 1–9 had higher adhesion of a copper plating layer to the R-T-B magnet substrate and higher covering power of the copper plating layer than those in COMPARATIVE EXAMPLES 1–5, whereby the copper plating layers of EXAMPLES 1–9 were free from pinholes with higher Vickers hardness and scratch resistance. Also, the thermal demagnetization ratio was as good as 0% in any of EXAMPLES 1–9. On the other hand, the thermal demagnetization ratio was 7.5–13.5% in COMPARATIVE EXAMPLES 1–3, indicating poor heat resistance in magnetic properties. Though COMPARATIVE EXAMPLES 4 and 5 had a good thermal demagnetization ratio, the electrolytic copper plating solution of COMPARATIVE EXAMPLE 4 contained cyanide, posing the problems of safety and environment. COMPARATIVE EXAMPLE 4 was also low in Vickers hardness and poor in scratch resistance. COMPARATIVE EXAMPLE 5 was electroless copper plating, resulting in low Vickers hardness and poor scratch resistance.

EXAMPLE 10

Each of rectangular plate-shaped R-T-B sintered magnets of 6 mm in length, 60 mm in width and 4 mm in thickness with anisotropy in the thickness direction, which had a main component composition (weight %) comprising 26.0% of Nd, 4.0% of Pr, 2.5% of Dy, 1.0% of B, 2.0% of Co, 0.1% of Ga, 0.1% of Cu, 0.05% of Al and 64.25% of Fe, was formed by electrolytic copper plating and then electrolytic nickel plating at a current density of 0.45 A/dm$^2$ in the same manner as in EXAMPLE 1, to form a sample with an exposed electrolytic copper plating layer. The X-ray diffraction of this sample revealed that the I(200)/I(111) of the sample was 0.32. Further, the same measurement of the sample with an exposed electrolytic copper plating layer as in EXAMPLE 1 revealed that the electrolytic copper plating layer had a Vickers hardness of 298, and that the number of pinholes in the electrolytic copper plating layer was 0/cm$^2$.

EXAMPLE 11

Figure 2A:
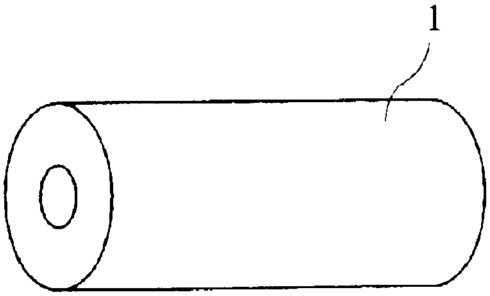
FIG. 2(*a*) is a schematic view for describing the good appearance of the Cu/Ni-plated R-T-B magnet in EXAMPLE 11.
Figure 2B:
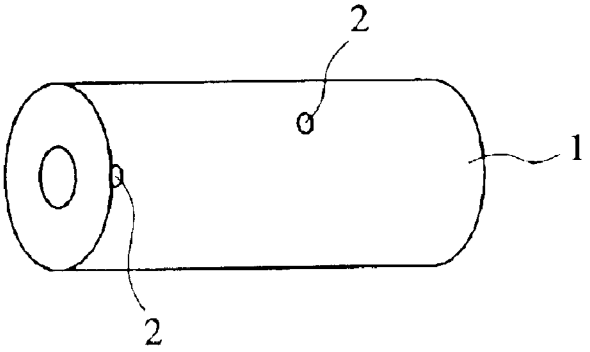

A predetermined number of barrel tanks were prepared, each barrel tank containing 1000 R-T-B sintered ring magnets each having the same main component composition as the R-T-B magnet of EXAMPLE 10 and a shape of 2.5 mm in outer diameter, 1.2 mm in inner diameter and 5.0 mm in axial length shown in FIG. 2(*a*) with radial two-pole anisotropy. Each barrel tank was immersed in an electrolytic copper plating bath, to form an electrolytic copper plating layer on each R-T-B sintered ring magnet in the same manner as in EXAMPLE 4 except for using the current density of 0.45 A/dm$^2$ and the plating time of 5 minutes, 10 minutes, 20 minutes, 40 minutes, 60 minutes, 70 minutes, 80 minutes, and 90 minutes. Next, an electrolytic nickel plating layer having an average thickness of 5 μm was formed in the same manner as in EXAMPLE 10, to form an electrolytic copper-plated R-T-B magnet for a vibrating motor. The average thickness of the electrolytic copper plating layer was substantially proportional to the plating time, 3 μm for the plating time of 20 minutes, 5 μm for 40 minutes, and 8 μm for 80 minutes.

1000 samples (Cu/Ni-plated R-T-B magnets) 1 in each barrel tank obtained by successively carrying out electrolytic copper plating and electrolytic nickel plating were tested with respect to appearance. The results are that any sample had a good surface free from dents as shown in FIG. 2(*a*). Incidentally, when there were dents 2, they were in a shape exemplified in FIG. 2(*b*). With the maximum length of an opening of each dent 2 regarded as the size of dent 2, there arise the problems of poor appearance and corrosion resistance when the size of the dent 2 is 50 μm or more (usually about 50–500 μm). Because the plated R-T-B magnets 1 with the size of the dents 2 less than 50 μm are within a practically permitted range, they can be used for practical applications.

Figure 6:
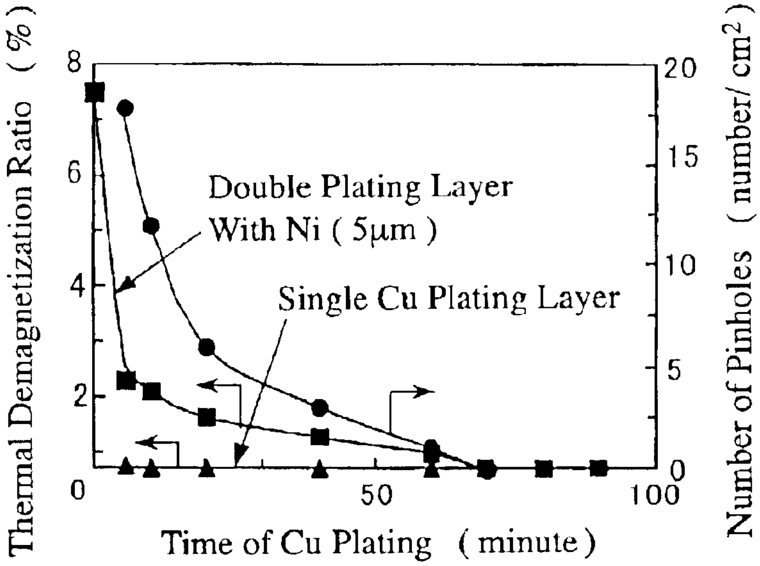
FIG. 6 is a graph showing the relations between the plating time of electrolytic copper and the thermal demagnetization ratio of the plated R-T-B magnet and the number of pinholes in the plating layer in EXAMPLE 11.

The resultant R-T-B magnets for vibrating motors were arbitrarily sampled to measure a thermal demagnetization ratio in the same manner as in EXAMPLE 1. The relations between the thermal demagnetization ratio (%) and the time (minute) of electrolytic copper plating were plotted by black squares in FIG. 6. The plots (black squares) at the plating time of 0 minute in FIG. 6 indicates the thermal demagnetization ratio of the above sintered ring magnet substrate. An nickel plating layer was removed by etching from the surface of the R-T-B magnet for a vibrating motor in the same manner as in EXAMPLE 1, to prepare a sample with an exposed electrolytic copper plating layer. The measurement results of pinholes penetrating from a surface to the R-T-B magnet substrate in each sample according to a ferroxyl test method (JIS H 8617) were plotted by black circles in FIG. 6. It was found from these results that when-electrolytic copper plating and electrolytic nickel plating were successively carried out on the surface of the R-T-B magnet, the number of pinholes penetrating to the magnet substrate was as small as 0, and the thermal demagnetization ratio was as low as 0% in the electrolytic copper plating layer having an average thickness of 8 μm or more, resulting in remarkably improved corrosion resistance.

A predetermined number of barrel tanks each containing 1000 R-T-B sintered ring magnets of 2.5 mm in outer diameter, 1.2 mm in inner diameter and 5.0 mm in axial length with radial two-pole anisotropy were immersed in a plating bath, to carry out an electrolytic copper plating treatment under the same conditions as above for 5–90 minutes, thereby forming a plurality of samples with electrolytic copper plating layers. As a result of the test of appearance on these 1000 samples, all samples had good appearance free from dents. Those arbitrarily sampled were measured with respect to a thermal demagnetization ratio in the same manner as in EXAMPLE 1. The relations between the thermal demagnetization ratio (%) and the plating time of electrolytic copper (minute) were plotted by black triangles in FIG. 6. Why all plots (black triangles) indicated the thermal demagnetization ratio of 0% is due to the fact that only an electrolytic copper plating layer was formed on the R-T-B sintered magnet. On the other hand, in the case of the plots (black squares, black circles), because the electrolytic copper plating layer was in contact with the corrosive electrolytic nickel plating solution, the R-T-B magnet per se was damaged if the electrolytic copper plating layer had insufficient thickness.

Figure 7A:
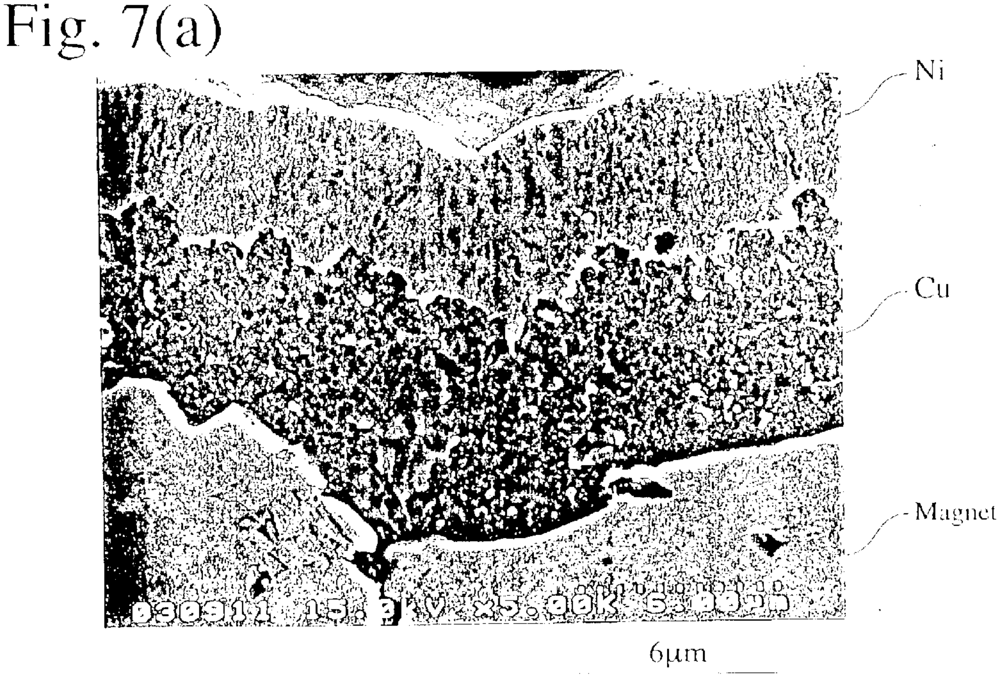
FIG. 7(*a*) is a scanning electron photomicrograph showing the cross section structure at a center on the outer diameter side of the Cu/Ni-plated R-T-B ring magnet in EXAMPLE 11.
Figure 7B:

With respect to the Cu/Ni-plated R-T-B sintered ring magnet provided with an electrolytic copper plating layer having an average thickness of 9 μm and an electrolytic nickel plating layer having an average thickness of 5 μm at the plating time of 90 minutes, a scanning electron photomicrograph of its cross section structure at a center on the outer diameter side is shown in FIG. 7(*a*), and a scanning electron photomicrograph of its cross section structure at a center on the inner diameter side is shown in FIG. 7(*b*). It is clear from FIGS. 7(*a*) and (*b*) that the electrolytic copper plating layer had substantially the same thickness of both on the outer and inner sides, with good covering power. With respect to the second layer, which was an electrolytic nickel plating layer formed by a Watts bath, its thickness on the inner side was as small as about ⅕ that on the outer side. Nevertheless, such second layer is satisfactory for practical use.

A nickel plating layer was removed by etching from the surface of the R-T-B magnet comprising an electrolytic copper plating layer having an average thickness of 9 μm and an electrolytic nickel plating layer having an average thickness of 5 μm, to form a sample with an exposed electrolytic copper plating layer for X-ray diffraction measurement. As a result, the I(200)/I(111) of the sample was 0.32. As a result of measurement of this sample with respect to Vickers hardness on a flat surface, the Vickers hardness was 298.

EXAMPLE 12

Magnet pieces for CD pickups were cut out from the same R-T-B sintered magnet as used in EXAMPLE 1. The magnet pieces were degreased and washed with water. Next, they were immersed in a diluted nitric acid bath at room temperature and then washed with water to clean the surfaces of the R-T-B magnet pieces. After introducing 500 cleaned R-T-B magnet pieces into a barrel tank, an electrolytic copper plating layer having an average thickness of 10 μm and an electrolytic nickel plating layer having an average thickness of 8 μm were successively formed on a surface of each R-T-B magnet piece in the same manner as in EXAMPLE 4, to prepare a Cu/Ni-plated R-T-B magnet of 3.0 mm in length, 3.0 mm in width and 1.5 mm in thickness with anisotropy in thickness direction for a CD pickup.

A sample with an exposed electrolytic copper plating layer was formed from this Cu/Ni-plated R-T-B magnet in the same manner as in EXAMPLE 1 to measure its X-ray diffraction. As a result, it was found that the I(200)/I(111) was 0.33. The electrolytic copper plating layer of this sample had a Vickers hardness of 295 free from pinholes and dents. It had also good adhesion and a substantially uniform thickness.

COMPARATIVE EXAMPLE 8

Though it was tried to form an electrolytic copper plating on an R-T-B magnet in the same manner as in EXAMPLE 12 except for using the copper plating solution (pH of 9.0) of COMPARATIVE EXAMPLE 7 as an electrolytic copper plating solution, electrolytic copper plating could not be carried out for the same reasons as in COMPARATIVE EXAMPLE 7.

COMPARATIVE EXAMPLE 9

The same 1000 degreased and acid-treated R-T-B sintered ring magnets of 2.5 mm in outer diameter, 1.2 mm in inner diameter and 5.0 mm in axial length with radial two-pole anisotropy as used in EXAMPLE 11 were introduced into a barrel tank, and subsequent processes were carried out in the same manner as in COMPARATIVE EXAMPLE 4 to form an electrolytic copper plating layer having an average thickness of 9 μm and then an electrolytic nickel plating layer having an average thickness of 5 μm on each ring magnet, thereby preparing magnets for a vibrating motor. As a result of the examination of the resultant samples, it was observed that 29 out of 1000 magnets had as large dents 2 as 90–420 μm exemplified in FIG. 2(*b*) on their surfaces, indicating that they were poor in appearance. These dents 2 had depth of several μm, and some magnet substrates were directly nickel-plated in the dents 2. It was found that the dents 2 had pinholes, deteriorating the corrosion resistance of the magnet.

COMPARATIVE EXAMPLE 10

The same 500 degreased and acid-treated magnet pieces for CD pickups as used in EXAMPLE 12 were introduced into a barrel tank, and subsequent processes were carried out in the same manner as in COMPARATIVE EXAMPLE 5, to form an electroless copper plating layer having an average thickness of 10 μm and then an electrolytic nickel plating layer having an average thickness of 8 μm on each magnet piece, thereby preparing Cu/Ni-plated R-T-B magnets for a CD pickup. The measurement of the appearance of the resultant samples revealed that 27 out of 500 plated magnet pieces had as large dents as 100–340 μm on their surfaces, meaning poor appearance and corrosion resistance.

Though an electrolytic or electroless nickel plating layer was formed on an electrolytic copper plating layer in the above EXAMPLES, the present invention is not restricted thereto. For instance, a plating layer of at least one selected from the group consisting of Ni—Cu alloys, Ni—Sn alloys, Ni—Zn alloys, Sn—Pb alloys, Sn, Pb, Zn, Zn—Fe alloys, Zn—Sn alloys, Co, Cd, Au, Pd and Ag may further be formed on the electrolytic copper plating layer, to achieve good corrosion resistance, thermal demagnetization resistance and scratch resistance.

Though EDTA was used as a chelating agent in the above EXAMPLES, the chelating agent is not restricted thereto, and the same effects as in the above EXAMPLES can be obtained by using an electrolytic copper plating solution containing other chelating agents than EDTA.

The electrolytic copper plating method of the present invention is effective for hot-worked R-T-B magnets having as a main phase an $R_2T_{14}B$ intermetallic compound, wherein R is at least one of rare earth elements including Y, and T is Fe or Fe and Co. It is also effective for sintered magnets of $SmCo_5$ or $Sm_2Co_{17}$.

APPLICABILITY IN INDUSTRY

The electrolytic copper plating method of the present invention can produce an electrolytic copper plating layer having a substantially uniform thickness and high adhesion and excellent scratch resistance and thermal demagnetization resistance free from pinholes. Also, because it uses a plating solution containing no extremely toxic cyanides, it is highly safe and easy to treat the plating solution. Because the R-T-B magnet formed with an electrolytic copper plating layer by the electrolytic copper plating method of the present invention has excellent oxidation resistance and appearance, it is suitable for thin or small high-performance magnets.

What is claimed is:

1. A method for forming an electrolytic copper plating on an R-T-B magnet, wherein R is at least one of rare earth elements including Y, and T is Fe or Fe and Co, comprising using an electrolytic copper plating solution containing 20–150 g/L of copper sulfate and 30–250 g/L of a chelating agent without containing an agent for reducing a copper ion, the pH of said electrolytic copper plating solution being controlled to 10.5–13.5.

2. The method for forming an electrolytic copper plating on an R-T-B magnet according to claim 1, wherein ethylenediaminetetraacetic acid (EDTA) is used as said chelating agent.

3. The method for forming an electrolytic copper plating on an R-T-B magnet according to claim 1, wherein said agent for reducing copper ions is formaldehyde.

4. The method for forming an electrolytic copper plating on an R-T-B magnet according to claim 1, wherein said R-T-B magnet contains as a main phase an $R_2T_{14}B$ intermetallic compound, wherein R is at least one of rare earth elements including Y, and T is Fe or Fe and Co.

5. An R-T-B magnet having an electrolytic copper plating layer, in which a ratio of I(200)/I(111), wherein I(200) is an X-ray diffraction peak intensity of a (200) face, and I(111) is an X-ray diffraction peak intensity of a (111) face, is 0.1–0.45 in the X-ray diffraction of said electrolytic copper plating layer obtained with a CuKα1 line.

6. The R-T-B magnet according to claim 5, comprising a first layer of said electrolytic copper plating layer, and a second layer formed on said first layer, said second layer being a plating layer comprising at least one selected from the group consisting of Ni, Ni—Cu alloys, Ni—Sn alloys, Ni—Zn alloys, Sn—Pb alloys, Sn, Pb, Zn, Zn—Fe alloys, Zn—Sn alloys, Co, Cd, Au, Pd and Ag.

7. The R-T-B magnet according to claim 6, wherein said the second layer is constituted by an electrolytic or electroless nickel plating layer.

8. The R-T-B magnet according to any one of claim 5, wherein said electrolytic copper plating layer has pinholes in the number of $0/cm^2$ when measured by a ferroxyl test method (JIS H 8617), and further has a Vickers hardness of 260–350.

9. The R-T-B magnet according to claim 6, wherein a chemical conversion coating layer is formed on a plating layer constituted by said second layer.

10. The R-T-B magnet according to claim 9, wherein a surface of said chemical conversion coating layer is subjected to an alkali treatment.

11. An R-T-B magnet with a plating layer, wherein R is at least one of rare earth elements including Y, and T is Fe or Fe and Co, wherein said plating layer comprises an electrolytic copper plating layer and an electrolytic or electroless nickel plating layer in this order from the magnet side; wherein a ratio of I(200)/I(111), wherein I(200) is an X-ray diffraction peak intensity of a (200) face, and I(111) is an X-ray diffraction peak intensity of a (111) face, is 0.1–0.45 in the X-ray diffraction of said peak intensity of a (200) face, and I(111) is an X-ray diffraction peak intensity of a (111) face, is 0.1–0.45 in the X-ray diffraction of said electrolytic copper plating layer obtained with a CuKα1 line, and wherein said electrolytic copper plating layer is formed by an electrolytic copper plating method using an electrolytic copper plating solution containing 20–150 g/L of copper sulfate and 30–250 g/L of a chelating agent without containing an agent for reducing a copper ion, the pH of said electrolytic copper plating solution being controlled to 10.5–13.5.

12. The R-T-B magnet according to claim 5, wherein it is used for a rotor or an actuator.

13. The R-T-B magnet according to claim 11, wherein it is used for a rotor or an actuator.

* * * * *